Figure 1:
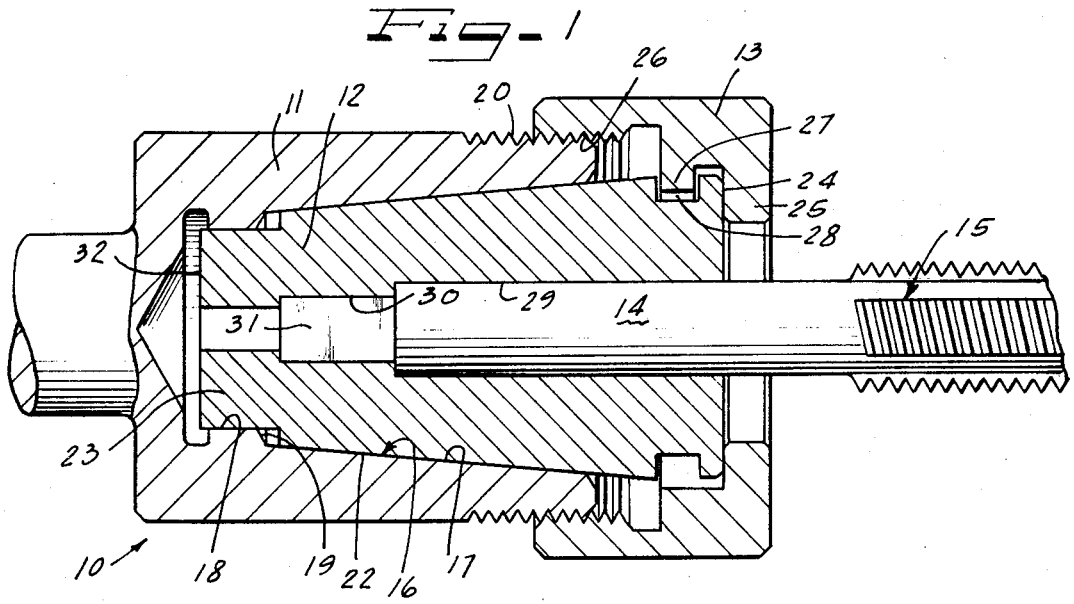

United States Patent [19]
Zeilinger

[11] 3,726,532
[45] Apr. 10, 1973

[54] COLLET CHUCK FOR A TAP

[75] Inventor: James G. Zeilinger, Saginaw, Mich.

[73] Assignee: Houdaille Industries, Inc., Buffalo, N.Y.

[22] Filed: Sept. 21, 1970

[21] Appl. No.: 74,017

[52] U.S. Cl. ..................................279/52, 279/59
[51] Int. Cl. ............................................B23b 31/12
[58] Field of Search.....................279/51, 58, 59, 42, 279/52, 41 A, 41

[56] References Cited

UNITED STATES PATENTS

| | | | |
|---|---|---|---|
| 2,381,335 | 8/1945 | Clare | 279/51 |
| 2,370,487 | 2/1945 | Poutie | 279/42 |
| 235,283 | 12/1880 | Olin | 279/51 X |
| 1,588,281 | 6/1926 | Styron | 279/52 |
| 1,839,569 | 1/1932 | Lovejoy | 279/42 |
| 2,466,197 | 4/1949 | Berthiez | 279/59 X |
| 2,709,600 | 5/1955 | Lehde | 279/52 |
| 3,451,686 | 6/1969 | Hammond | 279/51 |

*Primary Examiner*—Andrew R. Juhasz
*Assistant Examiner*—Z. R. Bilinsky
*Attorney*—Hill, Sherman, Meroni, Gross & Simpson

[57] ABSTRACT

A collet chuck for a tap includes a body, a tapered compressible collet, and a clamping member or nut threaded on the body and having a flange acting axially on the collet. The body has a bore at its inner end of non-circular configuration forming a socket receptive of the inner end of the collet which is of similar shape. The threads between the clamping member and the body are so arranged that unless the non-circular portion of the collet is received in the body socket, the threads cannot engage.

2 Claims, 2 Drawing Figures

INVENTOR.
JAMES G. ZEILINGER

COLLET CHUCK FOR A TAP

BACKGROUND OF THE INVENTION

1. Field of the Invention

This invention relates to a collet chuck for use in a machine tool, and more specifically to one that is especially suitable for use with a cutting tap.

2. Prior Art

Heretofore, it has been known to use a body having a bore that receives a radially compressible collet, and a nut threaded on the body for urging the collet in an axial direction, both for clamping and unclamping. An example of such prior art is shown in U. S. Pat. No. 3,451,686. While a tool of such a type comprises an advantageous construction, when the collet is used to clamp on the cylindrical shank of a tap, there is a tendency for the tap to slip. It has also been known to use a special type of positive drive to insure that there will be no internal slippage in the chuck. However, on occasion, there has been a false seating of the tap coupled with clamping of the nut tightly onto the chuck body without obtaining adequate radial compression of the collet as a consequence of such tightening of the nut. When this has happened, the tap usually falls out if the device is used on a vertical axis. While there is a risk of damage to a workpiece or to a tap by such an occurrence, there has been an even greater risk where the rotational axis has been horizontal, because then the false clamping has gone undetected, and such a condition is particularly conducive to workpiece damage and to tap damage.

SUMMARY OF THE INVENTION

The collet chuck is therefore so constructed that the threads of the nut or clamping member cannot engage with the threads of the body unless the angular driving connection between the collet and the body is properly angularly oriented.

Accordingly, it is an object of the present invention to provide a collet chuck for handling cutting tools.

A further object of the present invention is to provide a collet chuck that is especially adapted to provide an angular drive that has a positive angular driving connection between certain components.

Another object of the present invention is to provide a collet chuck wherein its features are so arranged that the likelihood of false clamping is eliminated.

Many other advantages, features and additional objects of the present invention will become manifest to those versed in the art upon making reference to the detailed description and the accompanying sheet of drawings in which a preferred structural embodiment incorporating the principles of the present invention is shown by way of illustrative example.

Figure 2:
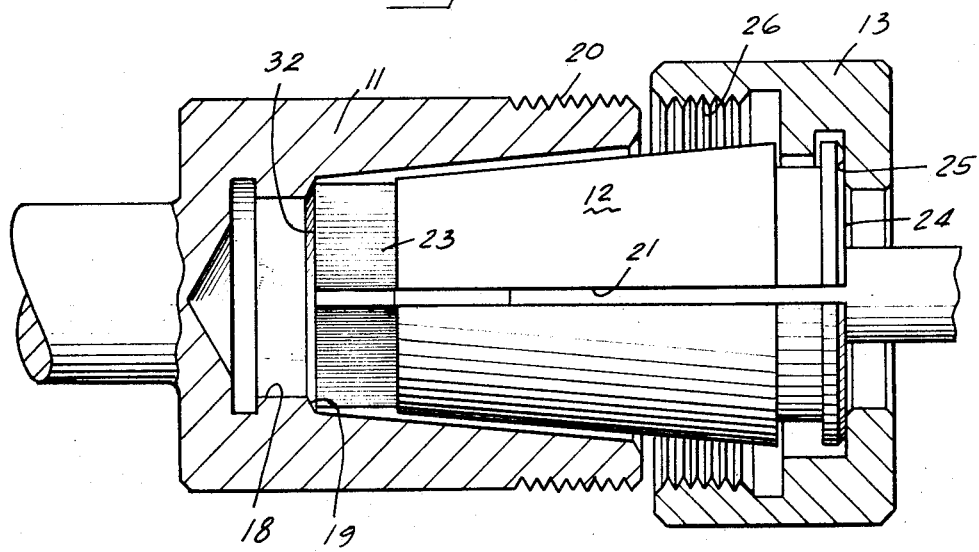

On the drawings:

FIG. 1 is a cross-sectional view of a collet chuck supporting a tap, and provided in accordance with the present invention; and FIG. 2 is a similar view with the components arranged to illustrate how they coact to prevent false clamping.

As shown on the drawings:

This invention is particularly useful when embodied in a collet chuck such as is illustrated in FIG. 1, and generally indicated by the numeral 10. The collet chuck 10 includes a body 11, a collet 12, and a nut or clamping member 13. As shown, the nut or clamping member 13 is in a tightened position on the body 11 whereby the collet 12 is radially compressed onto a circular shank 14 of a cutting tap 15.

The body 11 has an axial bore 16 that includes a tapered portion 17 of round cross section, at the inner end of which there is a socket 18 of non-circular cross section, for example, square cross section. The socket has thus a cross-sectional dimension that is smaller than the bore portion 17, and where the socket 18 joins with the tapered portion 17, there is therefore provided an axially facing shoulder 19 which is at one end of the socket 18, namely between the socket and the tapered portion 17. The body 11 has threads which may be internal or external and are here illustrated as external threads 20.

The collet 12 is radially slotted in a known manner, one of such slots being illustrated in FIG. 2 at 21 so as to render the collet 12 compressible radially in response to its being moved in an axial direction toward the inner end of the bore 16. The external configuration of the collet 12 corresponds to the internal configuration of the bore 16, and to that extent includes a tapered portion 22 of round cross section that merges with an inner end portion 23 of non-circular cross section, here square, to provide an angular driving connection between the body 11 and the collet 12 wherein such connection is axially slidable. The collet 12 has an end surface 24 against which a flange 25 of the clamping member 13 acts, the member 13 having a set of threads 26 which engage with the body threads 20 for effecting such axial urging of the collet 12.

The nut or clamping member 13 has a partial internal flange 27 received in a groove 28 on the periphery of the collet 12 for urging the collet 12 out of the bore 16 in response to loosening of the clamping member 13. Further details of the partial flange 27 and its operation are shown in U. S. Pat. No. 3,451,686.

In normal operation, a particular size of collet 12 is selected, is inserted with its surface 24 into the clamping member 13, and these two components as a pair are mounted on the body 11 with the non-circular portion 23 of the collet entering the socket 18 and the threads 26 engaging with the threads 20 so that when a tool shank is inserted therein, further tightening of the clamping member 13 will cause the collet 12 to compress radially and to clamp the tool therein. In the present embodiment, there is further included an additional driving connection. The collet 12 has a bore 29 of round cross section, at the inner end of which there is a non-circular socket 30, such as square, which is receptive of a correspondingly shaped tang or end 31 which forms part of the shank 14 of the tap 15. The positive driving connection that is transmitted by the body 11 through the non-circular socket 18 to the collet 12 is thus transmitted by the collet 12 through its non-circular socket 30 to the end of the tap 15.

At the time that the tool or the collet and tool are changed, the clamping member 13 is loosened, and in the present arrangement, the threads 20, 26 will become disengaged before the inner end 23 of the collet 12 disengages from the socket 18. Conversely, on assembly, as shown in FIG. 2, if the collet 12 were improperly angularly oriented so that its square inner end 23 were turned, for example 45°, so that the corners of the square would abut shoulder 19, then it would be impossible to mate the threads 20, 26, and thus the structure cannot be clamped with the collet 12 so angularly oriented with respect to the body 11. Thus, from the functional surface of the flange 25 which abuts the end surface 24 of the collet 12, there is a spacing in an axial direction to the remote end of the threads 26 on the nut 13, and there is an axial spacing between the body shoulder 19 and the axially remote end of the body threads 20, and these spacings or distances, taken in combination, represent a distance or have a smaller dimension than the axial distance between the entrant end 32 of the non-circular portion and the surface 24 on which the nut flange 25 acts. Thus, as is clearly shown in FIG. 2, the thread arrangement is such that the threads 20, 26 are fully disengaged whenever the non-circular collet portion 23 is out of the socket 18. Thus, it becomes an impossibility to achieve any axial clamping on the collet 12 unless the connection that enables corotation and sliding movement between the body and the collet is at least partially engaged.

Although various minor modifications might be suggested by those versed in the art, it should be understood that I wish to embody within the scope of the patent warranted hereon, all such embodiments as reasonably and properly come within the scope of my contribution to the art.

I claim:

1. A collet chuck for a tap comprising:
   a. a body having a bore including a socket of non-circular cross-section;
   b. a radially compressible collet having a portion of non-circular cross-section normally corotatably axially slidably disposed in said socket; and
   c. a clamping member threaded onto said body for acting axially on said collet, the threads on said body and on said clamping member being of such combined axial extent and location thereon as to be fully disengaged whenever said non-circular collet portion is out of said non-circular socket, whereby engagement of the clamping member threads with the body threads can be initiated only after said non-circular collet portion has at least partially entered said non-circular body socket.

2. A collet chuck according to claim 1 including a flange on said clamping member, a shoulder on said body between said socket and said tapered portion against which said collet can abut whenever said collet is not angularly aligned with said socket, said flange being spaced from the more remote end of the threads on said clamping member, and said body shoulder being axially spaced from the more remote end of the threads on said body by a combined distance which is less than the distance on said collet from the entrant end of the non-circular portion to the surface on which said flange acts.

* * * * *